United States Patent [19]

Nakamura et al.

[11] Patent Number: 5,389,847
[45] Date of Patent: Feb. 14, 1995

[54] ROTOR FOR A HIGH SPEED INDUCTION TYPE AC MOTOR HAVING A PRESS FIT STACKED CORE

[75] Inventors: Kosei Nakamura, Yamanashi; Yoshiyuki Hayashi, Sunto; Kazuhisa Numai, Yamanashi, all of Japan

[73] Assignee: Fanuc Ltd., Yamanashi, Japan

[21] Appl. No.: 974,588

[22] PCT Filed: Jun. 26, 1992

[86] PCT No.: PCT/JP92/00814
§ 371 Date: Feb. 25, 1993
§ 102(e) Date: Feb. 25, 1993

[87] PCT Pub. No.: WO93/00735
PCT Pub. Date: Jan. 7, 1993

[30] Foreign Application Priority Data

Jun. 28, 1991 [JP]  Japan .................... 3-049968

[51] Int. Cl.⁶ .................... H02K 1/00; H02K 17/16
[52] U.S. Cl. .................... 310/197; 310/218
[58] Field of Search .................... 310/197, 262, 42, 265, 310/268, 211, 212, 217, 218

[56] References Cited

U.S. PATENT DOCUMENTS 1,924,103  8/1933  Bisschop .
4,217,690  8/1980  Morreale .................... 310/217 X

FOREIGN PATENT DOCUMENTS 0343313   11/1989  European Pat. Off. .
   2991   12/1890  Germany .................... 310/211
52-162414 12/1977  Japan .
52-163716 12/1977  Japan .
57-89349   6/1982  Japan .
62-147935  7/1987  Japan .
 112288    1/1918  United Kingdom .
 231462   12/1925  United Kingdom .................... 310/211

OTHER PUBLICATIONS

Patent Abstracts of Japan, vol. 7, No. 162, Jul. 15, 1983, JP-A-58 069 451, Apr. 25, 1983.

*Primary Examiner*—Emanuel T. Voeltz
*Assistant Examiner*—E. To
*Attorney, Agent, or Firm*—Nikaido, Marmelstein, Murray & Oram

[57] ABSTRACT

A rotor 14 for a high speed induction type ac motor having a construction such that the rotor is provided with an iron core 20 provided, at the periphery thereof, with a plurality of through-bores 22 in which electro-conductive rods 24 made of aluminum rod members are forcibly inserted in a press-fitting manner so as to form opposite projections from the axial opposite ends of the iron core 20, electro-conductive end rings 26 connected to the projections of the electro-conductive rods 24, and slitted pins 30 press-fit in small blind bores 32 formed in the projections of the electro-conductive rods 24 to thereby fixedly attach the electro-conductive rings 26 to the opposite end faces of the iron core 20.

6 Claims, 3 Drawing Sheets

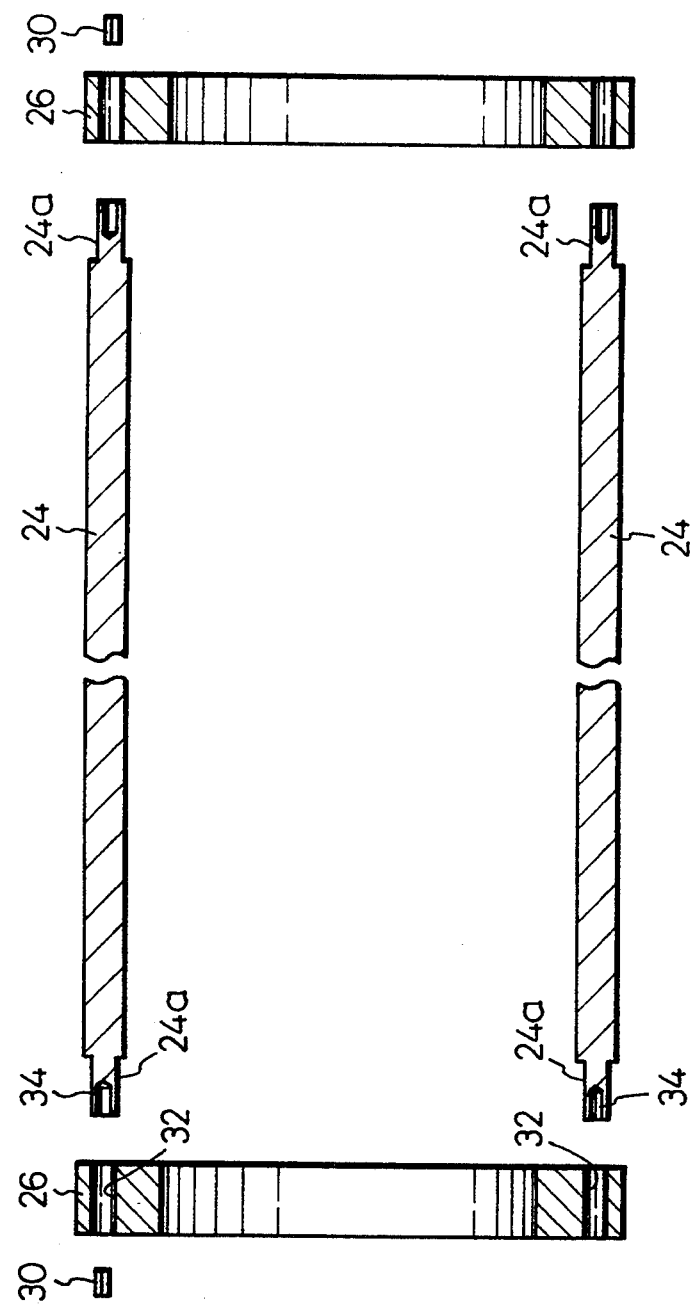

ROTOR FOR A HIGH SPEED INDUCTION TYPE AC MOTOR HAVING A PRESS FIT STACKED CORE

TECHNICAL FIELD

The present invention relates to a rotor for a high speed induction type ac motor. More particularly, it relates to rotor for a high speed induction type ac motor, provided with an iron core being a stacked assembly of laminations made of plates of magnetic material such as a silicon steel, with a plurality of axial through-bores formed in the periphery thereof. Electro-conductive rods made of aluminum rods are pressed in the plurality of bores of the iron core so as to be fixed therein, with ends protruding from opposite ends of the iron core. Electro-conductive end rings are arranged at the opposite ends of the iron core so as to be mechanically engaged with and electrically connected to the electro-conductive rods. Slitted tubular pins are forcibly fit in blind bores formed at the opposite ends of the electro-conductive rods so that elastic extension of the pins ensures rigid and fixed connection between the ends of the electro-conductive rods and the electro-conductive end rings.

PRIOR ART

A conventional high speed induction type ac motor, especially an induction type ac motor incorporated in a machine tool as a rotary drive source for providing the spindle of the machine tool with high speed rotation, typically has a rotative rotor having a construction such that the stacked iron core of the rotor is formed with a plurality of slots, and end portions filled with aluminum by a die-casting, or squeeze casting method. The cast aluminum functions as electrical conductors of the rotor when magnetic flux passes through the iron core.

when the aluminum is cast in the slots and the end portions of an iron core by the die-casting or squeeze casting method, the iron core is put in place in a metallic mould into which aluminum melt is poured under pressure. Thus, the aluminum cast rotor for an induction type ac motor can be produced at a considerably high production rate.

Nevertheless, in the rotor construction having therein cast aluminum electric conductors, the generation of cavities within the cast aluminum cannot be avoided. Therefore, when the rotor is rotated at a high speed, the cast aluminum of the rotor sometimes bursts at portions adjacent to the cavities, thereby causing electrical and/or mechanical damage to the induction type motor.

DESCRIPTION OF THE INVENTION

Accordingly, a principal object of the present invention is to improve the construction of the above-described conventional rotor for an induction type ac motor.

Another object of the present invention is to provide a rotor for a high speed induction type ac motor, provided with a construction such that the aluminum electric conductors permitting passage of an electric current in response to the passing of the magnetic flux through the iron core are mechanically assembled in the iron core so as to prevent the generation of casting cavities that might occur during the conventional die-casting or squeeze casting method.

A further object of the present invention is to provide a rotor for a high speed induction type ac motor, in which the rotor is mechanically assembled from separately prepared elements, i.e., an iron core, electro-conductive rods or bars made of aluminum bars and press-fit in a plurality of through-bores formed in the periphery of the iron core, annular-shape end rings attached to opposite ends of the iron core so as to be connected to the aluminum electro-conductive rods, and a slitted tubular pin for providing a rigid mechanical connection between the aluminum electro-conductive rods and the end rings in a manner such that the connections of the elements are not loosened even under high speed rotation of the rotor in order to prevent deterioration in the mechanical and electric performances of the motor.

To achieve the above-mentioned objects, in accordance with the present invention, there is provided a rotor for a high speed induction type ac motor having a construction which comprises:

an iron core having a stacked construction and a plurality of axial through-bores disposed at peripheral portions thereof so as to pierce therethrough and be equiangularly arranged in a circumferential direction thereof;

a plurality of electrically conductive rod-like members inserted in and disposed in the plurality of axial through-bores of said stacked iron core; each of said plurality of electrically conductive rods or bar-like members having both ends projecting outward from opposite axial end faces of said stacked iron core, respectively;

electrically conductive annular end rings; each having an axial bore therein to be engaged with each of said ends of each of said plurality of electrically conductive rod or bar-like members and fit in said both axial ends of said stacked iron core, and;

elastically expandable and shrinkable connecting members, each being adapted so as to fit in a blind bore of said each end of said plurality of electrically conductive rods or bar-like members, thereby rigidly connecting said electrically conductive end ring to said end face of said stacked iron core.

The above-mentioned elastically expandable and shrinkable connecting members may be slitted tubular pin members, which are commonly available. The slits of each pin member are able to exhibit the expandable and shrinkable property so as to provide a rigid mechanical connection between different members.

BRIEF DESCRIPTION OF THE DRAWINGS

The above and other objects, features, and advantages of the present invention will be made apparent from the ensuing description of the preferred embodiment in conjunction with the accompanying drawings wherein:

FIG. 4 is an exploded view of elements for assembling the rotor, such as the aluminum electro-conductive rods, the electro-conductive end ring, and the slitted tubular pins.

The Best Mode of Carrying out the Invention

Figure 1:
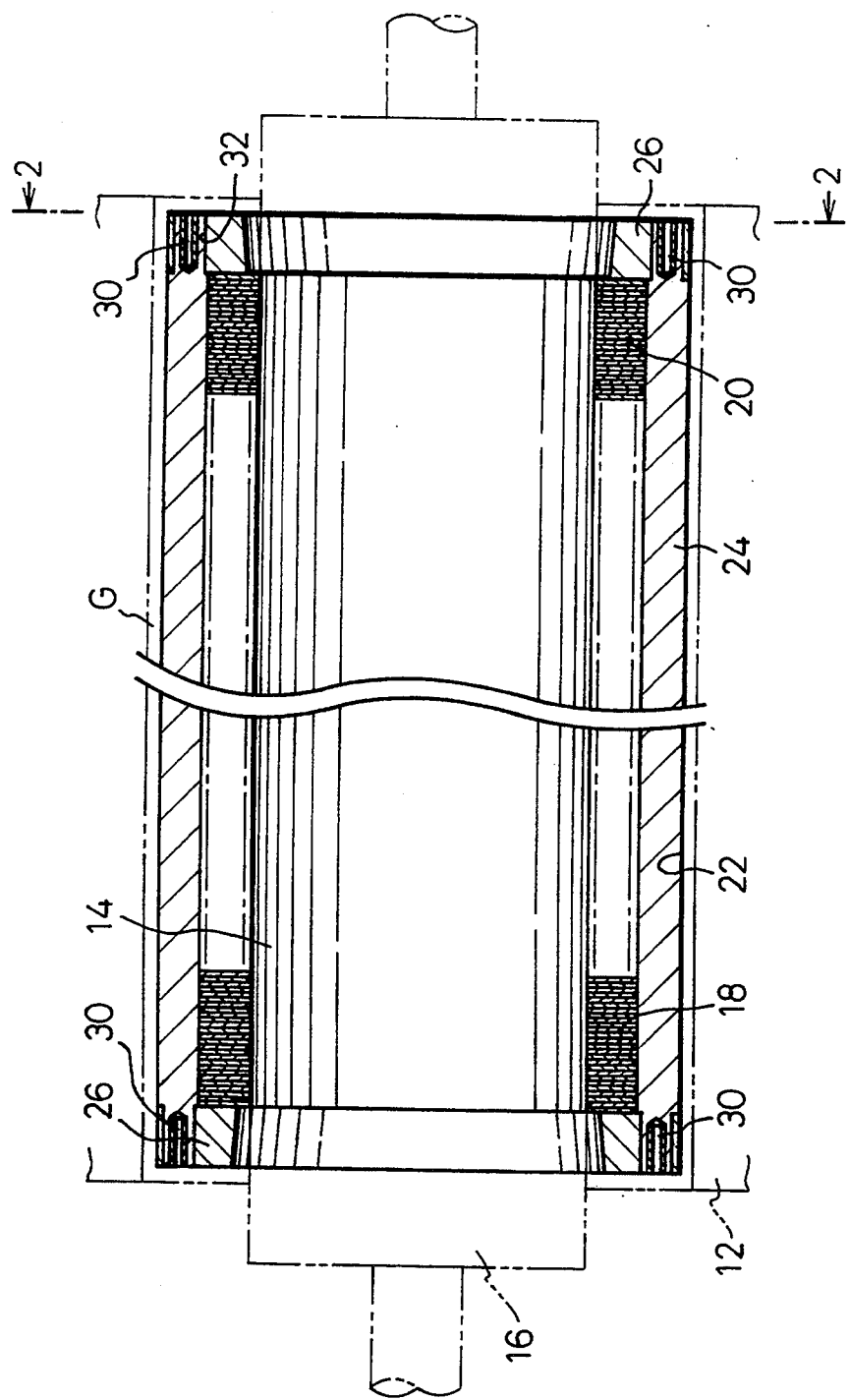
FIG. 1 is a longitudinal cross-sectional view schematically illustrating the construction of a high speed induction type ac motor provided with a rotary element, i.e., a rotor according to the present invention.
Figure 2:
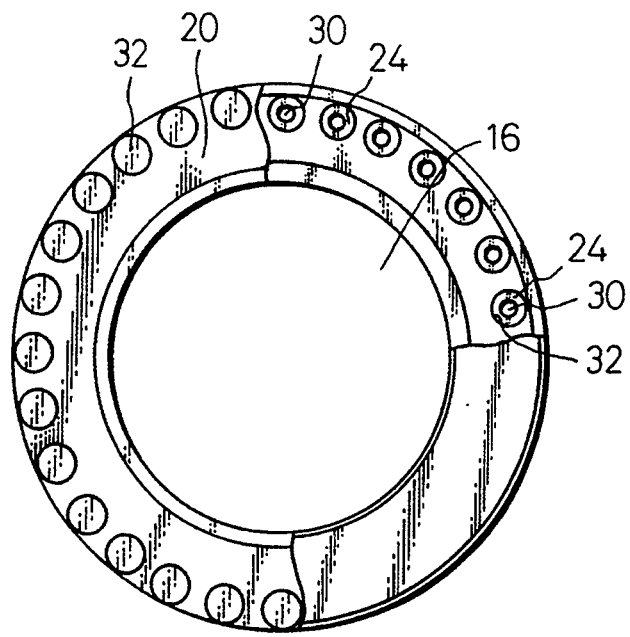
FIG. 2 is an end view taken along the line 2—2 of FIG. 1.

Referring to FIGS. 1 and 2, a high speed induction type ac motor provided with, as a rotary element thereof, a rotor having a mechanically assembled construction according to the present invention has a rotor 14 arranged inside a cylindrical bore of a stator 12 shown by a chain line, via a gap G. The rotor 14 includes an iron core part 18 and a shaft 16. The latter shaft 16 is rotatably supported by rotary bearings (not shown in the drawings) held by a housing (not shown).

The construction of the iron core part 18 of the rotor 14 is different from that of the conventional iron core part having aluminum electric conductors cast by the die-casting or squeeze casting method, and is provided with a iron core 20 assembled by stacking a plurality of laminations made of magnetic steel plates, a plurality of electro-conductive rods 24 made of aluminum rods and press-fit in a plurality of axial through-bores formed in the periphery of the iron core 20, electro-conductive annular end rings 26, 26 attached to the axial opposite ends of the iron core 20, and slitted tubular pins 30 connecting the opposite ends of the aluminum electro-conductive rods 24 and both electro-conductive rings 26.

The iron core 20 in the form of stacked laminations is provided with a plurality of through-bores 22 formed in the peripheral portion thereof so as to be arranged in the circumferential direction at a predetermined spacing. Namely, when respective laminations are produced by stamping from a raw material of a magnetic steel plate, the through-bores 22 are simultaneously formed. Thus, when the laminations are stacked to form an iron core, the iron core is provided with the through-bores 22 extending in the lamination stacking 30 direction, i.e., in the axial direction. The through-bores 22 of the iron core 20 are provided for permitting filling of electro-conductive material therein, which is indispensable for constructing an ac induction type motor.

The through-bores 22 of the lamination-stacked iron core 20 is therefore filled with electro-conductive rods 24; each being made of an aluminum rod having a diameter slightly larger than that of the through-bore 22. The electro-conductive aluminum rods 24 having a predetermined length longer than an axial width of the iron core 20 are forcibly press-fit into the through-bores 22 from one end of the iron core 20 until the ends of the electro-conductive aluminum rod 24 are projected outward from the opposite ends of the iron core 20. The projected ends of respective electro-conductive aluminum rods 24 are engaged in corresponding bores 32 of electro-conductive end rings 26, 26 preferably made of aluminum material so as to fixedly attach both end rings 26 to the end of the iron core 20.

When the electro-conductive end rings 26, 26 are fixedly attached to the end faces of the iron core 20, slitted pins 30 are then forcibly fit in small axial blind bores preliminarily formed at the opposite ends of respective electro-conductive aluminum rods 24. The slitted pins 30 are made of a tubular pin having an axial slit, respectively, and an outer diameter thereof is made larger than an inner diameter of the blind bore of the electro-conductive aluminum rod 24, and therefore when the slitted tubular pins 30 are forcibly inserted in the small blind bores of the electro-conductive aluminum rods 24, the slitted tubular pins 30 are pressurized and shrink radially. Accordingly, the slitted pins 30 exhibit an elastically expanding force that is resistant against the above-mentioned pressure so as to provide the electro-conductive aluminum rods 24 with a radial pressure by which the ends of the electro-conductive rods 24 are pressed against the electro-conductive end rings 26, 26 to establish a rigid mechanical connection between the rods 24 and the rings 26. The rigid mechanical connection brings about a condition such that the electro-conductive rods 24 are in complete contact with the electro-conductive end rings 26, 26, and accordingly, an electrical connection with a reduced electrical resistance is also established therebetween.

Figure 3A:
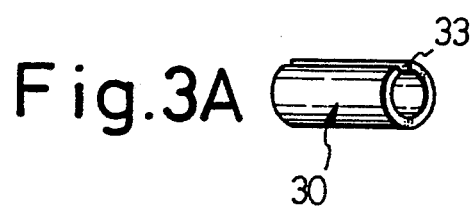
FIG. 3A is a perspective view of a slitted tubular pin used for assembling the rotor according to the present invention.

FIG. 3A illustrates the construction of the above-mentioned slitted tubular pin 30 that is a mechanical connecting tubular member having an axial slit 33 on the outer circumference thereof. The slitted pins 30 per se may have various diameters, and are generally made of steel material capable of exhibiting an elastically expanding and shrinking property in the radial direction. The slitted steel pins per se and commonly available, but according to the present invention, the slitted pins 30 are used for a particular purpose, i.e., for assembling a rotor of an electric motor.

Figure 3B:
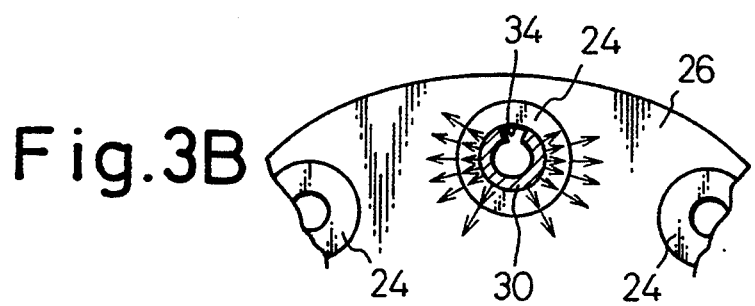
FIG. 3B is a partial explanatory view of an end of an electro-conductive annular ring of a rotor, illustrating the connecting operation exhibited by the expandable slitted tubular pin pressed in an aluminum electro-conductive rod.

FIG. 3B illustrates how the slitted tubular pins 30 are capable of providing a rigid mechanical connection between the ends of the electro-conductive aluminum rods 24 and the electro-conductive end rings 26. Namely, it illustrates that when the slitted pin 30 is forcibly inserted into the above-mentioned small blind bore 34 of the end of the electro-conductive rod 24, radial pressure acts on the inner wall surface of the small blind bore 34 of the electro-conductive aluminum rods 24, and therefore the electro-conductive aluminum rod 24 is pressed against the corresponding bore 32 of the electro-conductive end ring 26 so as to provide a fixed connection between the electro-conductive rod and end ring 24 and 26. Thus, the electro-conductive rods 24 and the electro-conductive end rings 26 are brought into close contact with one another so as to make electrical resistance therebetween as small as possible. As a result, the electro-conductive rods 24 and the end rings 26 can form an electric conductor with a small stable electric resistance during the operation of an induction type ac motor.

FIG. 4 illustrates the assembling process of the rotor in which the projections 24a of the opposite ends of the electro-conductive rods 24 are rigidly connected to the end rings 26 by using the slitted tubular pins 30. Namely, the projections 24a of respective electro-conductive aluminum rods 24 are engaged in the bores 32 of the end rings 26 and formed with axial blind-bores 34 for permitting the slitted pins 30 to be forcibly fit therein. The fitting of the slitted pins 30 in the blind-bores 34 of the rods 24 are implemented after the assembly of the end rings 26 and the rods 24.

From the foregoing description, it will be understood that, in accordance with the present invention, the rotor 14 for an induction type ac motor can be constructed by not using a die-casting of aluminum material. Accordingly, since the rotor 14 does not have any casting cavities in the aluminum parts thereof, the aluminum parts do not burst owing to the existence of cast cavities in the aluminum material with the rotor assembled in accordance with the present invention even when it is rotated at a high speed. Therefore, the rotor according to the present invention eliminates the problems of the prior art, i.e., the mechanical breakage and deterioration in the electrical performance encountered by the rotor for an induction type ac motor of the prior art.

Particularly, the slitted tubular pins 30 are axially fit in the electro-conductive rods, and accordingly, when the rotor is rotated at a high speed, the slitted pins are not subjected to centrifugal force.

It should be understood that the connecting force exhibited by the slitted pins when they are forcibly fit in the electro-conductive rods should be adjusted to an appropriate level. Thus, the mechanical dimensions of the pins and the material from which the slitted pins should be made so that they are selected depending upon the outer diameter of the electro-conductive rod and the diameter of the small blind bores thereof.

In accordance with the present invention, a rotor for a high speed induction type ac motor is provided with mechanically assembled aluminum parts, and is not provided with cast aluminum portions therein, and accordingly, even when the rotor rotates at a high speed, the aluminum parts of the rotor do not burst owing to the fact that there are no casting cavities therein. Thus, high speed rotation of the rotor can be safely realized.

Further, in the construction of the rotor according to the present invention, connection of the electro-conductive rods assembled in the iron core to the electro-conductive end rings is achieved by using the slitted tubular pins capable of constantly exhibiting a strong connecting force on the basis of the expanding and shrinking property of the slitted pins. Therefore, the mechanical strength of the connection does not deteriorate over a long operational life of the motor, and accordingly, the electrical resistance at the connection is not increased for the long operational life of the motor. Consequently, both mechanical and electrical performances of the high speed induction type ac motor are constantly maintained so as to provide a considerably reliable high speed induction type ac motor capable of being used as a rotary drive source of a machine tool spindle.

Moreover, assembly of the rotor can be easily effected by the utilization of the slitted tubular pins which are commonly available, and therefore the rotor can be manufactured at a low cost.

We claim:

1. A rotor for a high speed induction type ac motor comprising:
   an iron core having a stacked construction and a plurality of axial through-bores piercing therethrough and equiangularly arranged in a circumferential direction thereof;
   a plurality of electrically conductive rod-like members inserted in and disposed in the plurality of axial through-bores of said stacked iron core; each of said plurality of electrically conductive rod-like members having both ends projecting outward from both axial end faces of said stacked iron core, respectively;
   electrically conductive annular end rings, each having a plurality of axial bores therein, each of said axial bores to be engaged with corresponding ends of each of said plurality of electrically conductive rod-like members and fit in said both axial ends faces of said stacked iron core, and;
   elastically expandable and shrinkable connecting members, each being adapted to be fit in a blind bore of said each end of said plurality of electrically conductive rod-like members, thereby rigidly connecting said electrically conductive end ring to each of said end faces of said stacked iron core.

2. A rotor for a high speed induction type ac motor according to claim 1, wherein said electrically conductive annular end rings are made of an aluminum material.

3. A rotor for a high speed induction type ac motor according to claim 1, wherein each of said plurality of electrically conductive rod-like members is made of an aluminum rod.

4. A rotor for a high speed induction type ac motor according to claim 1, wherein each of said elastically expandable and shrinkable connecting members comprises a slit pin member.

5. A rotor for a high speed induction type ac motor according to claim 1, wherein said stacked iron core is provided with a shaft member fixedly mounted therein, and rotatably arranged inside a stator of said ac motor.

6. A rotor for a high speed induction type AC motor according to claim 1, wherein said elastically expandable and shrinkable connecting members have a cylindrical cross-section, and where each of said blind bores of said plurality of electrically conductive rod-like members is correspondingly cylindrical such that said elastically expandable and shrinkable connecting members fit in said blind bores.

* * * * *